(12) United States Patent
Kumar et al.

(10) Patent No.: US 9,683,109 B2
(45) Date of Patent: Jun. 20, 2017

(54) SELF HEALING ANTI CORROSIVE COATINGS AND A PROCESS FOR THE PREPARATION THEREOF

(71) Applicant: Council of Scientific and Industrial Research, New Delhi (IN)

(72) Inventors: Dhawan Sundeep Kumar, New Delhi (IN); Anoop Kumar Sasidharan, New Delhi (IN); Bhandari Hema, New Delhi (IN); Ruhi Gazala, New Delhi (IN); Sharma Brijesh, New Delhi (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 279 days.

(21) Appl. No.: 14/486,583

(22) Filed: Sep. 15, 2014

(65) Prior Publication Data

US 2015/0184304 A1    Jul. 2, 2015

(30) Foreign Application Priority Data

Dec. 30, 2013    (IN) .............................. 3813/DEL/2013

(51) Int. Cl.
*H01B 1/00*    (2006.01)
*C09D 5/08*    (2006.01)
(Continued)

(52) U.S. Cl.
CPC .............. *C09D 5/08* (2013.01); *C09D 7/125* (2013.01); *C09D 7/1216* (2013.01);
(Continued)

(58) Field of Classification Search
CPC ........... C08K 3/36; C08L 5/08; C09D 163/00; C09D 5/08; C09D 7/1216; C09D 7/125; H01B 1/124
See application file for complete search history.

(56) References Cited

U.S. PATENT DOCUMENTS 5,993,695 A    11/1999  Doorn et al.
6,756,123 B2    6/2004  Ha et al.
(Continued)

FOREIGN PATENT DOCUMENTS

CN    101864239 B    7/2012
CN    102702920    10/2012
(Continued)

OTHER PUBLICATIONS

Yang et al. "Synthesis of novel sunflower-like silica/polypyrrole nanocomposites via self-assembly polymerization" Polymer 47 (2006) 441-447.*
(Continued)

*Primary Examiner* — Mark Kopec
*Assistant Examiner* — Jaison Thomas
(74) *Attorney, Agent, or Firm* — Foley & Lardner LLP

(57) ABSTRACT

The present invention provides self-healing anti corrosive coatings comprising composites of conducting polymers, chitosan and silica particles along with epoxy useful for corrosion prevention under highly corrosive medium like 3.5% NaCl. Tafel plots exhibits significantly high corrosion protection efficiency (99.99%) for the epoxy coatings with 2.0 wt % loading of chitosan-polymer composite. The weight loss measurements and salt spray test results clearly exhibit superior corrosion resistance offered by coatings with chitosan-polymer composite. The synergistic interaction between chitosan and polypyrrole in the composite is expected to improve the corrosion resistance properties of the coatings. The $SiO_2$ particles present in the composite reinforce the integrity of the coating under corrosive conditions.

14 Claims, 8 Drawing Sheets

Figure 1:
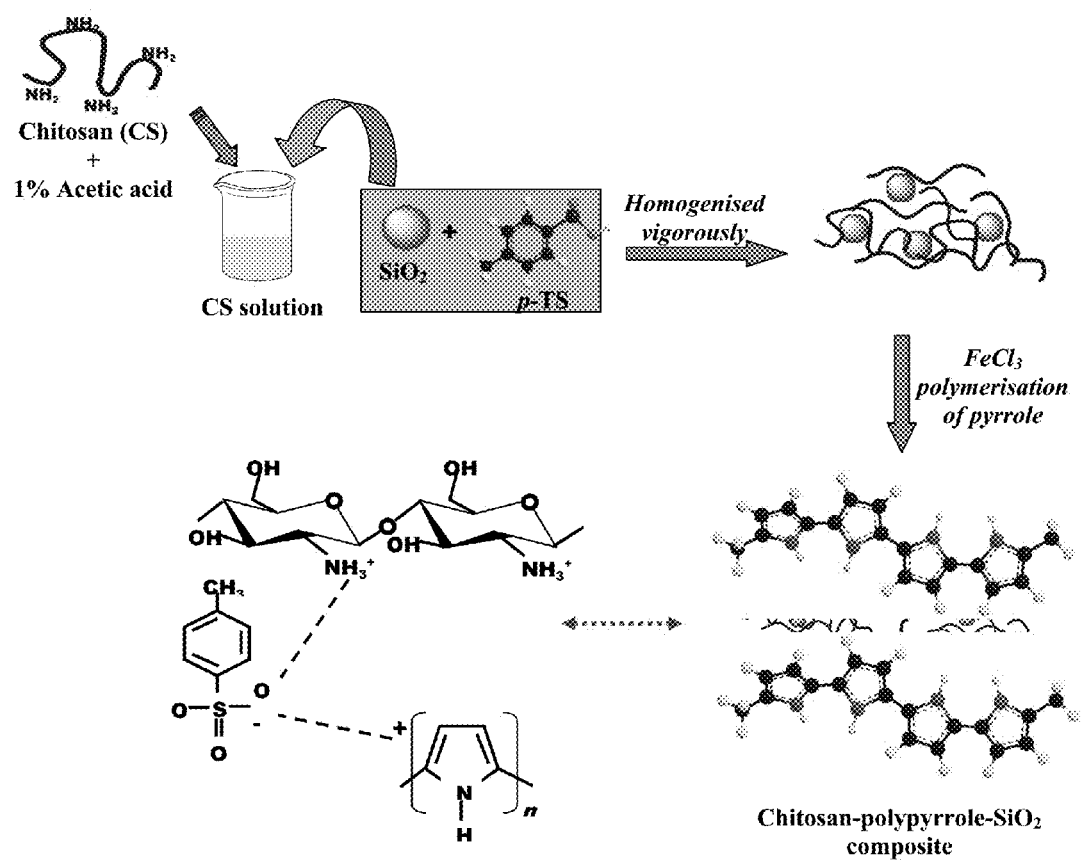

(51) Int. Cl.
  *H01B 1/12* (2006.01)
  *C09D 7/12* (2006.01)
  *C09D 163/00* (2006.01)
  *C08K 3/36* (2006.01)
  *C08L 5/08* (2006.01)

(52) U.S. Cl.
  CPC ........... *C09D 163/00* (2013.01); *H01B 1/125* (2013.01); *C08K 3/36* (2013.01); *C08L 5/08* (2013.01)

(56) References Cited

U.S. PATENT DOCUMENTS

| | | |
|---|---|---|
| 6,762,238 B1 | 7/2004 | Yang et al. |
| 8,298,350 B2 | 10/2012 | Cano-Iranzo |
| 2008/0305341 A1* | 12/2008 | Plieth .................... B82Y 30/00 428/419 |

FOREIGN PATENT DOCUMENTS

| | | |
|---|---|---|
| CN | 102101962 | 12/2012 |
| CN | 102352179 | 4/2013 |
| EP | 1723270 | 11/2006 |
| EP | 1779392 | 6/2012 |

OTHER PUBLICATIONS

Yalçinkaya, S. et al., "Electrochemical synthesis of poly(pyrrole-co-o-anisidine)/chitosan composite films," Journal of Molecular Structure 1135 (2017) 32-43.*

\* cited by examiner (a)
 (b)
 (c)
 (d)

SELF HEALING ANTI CORROSIVE COATINGS AND A PROCESS FOR THE PREPARATION THEREOF

CROSS-REFERENCE TO RELATED APPLICATIONS

The present application claims the benefit of priority under 35 U.S.C. §119 from Indian Patent Application No. 3813/DEL/2013, filed on Dec. 30, 2013, the disclosure of which is hereby incorporated by reference in its entirety for all purposes.

FIELD OF INVENTION

The present invention relates to self-healing anti corrosive coatings and a process for the preparation thereof. In particular, the present invention relates to smart coatings of conducting polymers which can be used for preventing corrosion under hostile environmental conditions. More particularly, the present invention relates to novel conducting polymer composites prepared by incorporating filler materials and suitably selecting a medium for polymerization so that the resultant epoxy coatings can be used for prevention of corrosion in saline water conditions. The invention further relates to synthesis of conducting polymers in specific hydrophobic medium because of which when these powders mixed in epoxies are powder coated, the corrosion inhibition response is observed.

BACKGROUND OF THE INVENTION & DESCRIPTION OF PRIOR ART

Mild steel has a wide array of industrial applications, but the tendency to corrode limits its service life in various engineering applications. Phosphate and chromate based conversion coatings are used for many years for corrosion protection purposes. But, these conversion coatings are discouraged over the past few years because of the strict environmental issues and human health concerns. As an alternative approach, eco-friendly paints and coatings are explored for corrosion protection of active metals. However, designing of such coatings having corrosion protection efficiency equivalent to their traditional counterparts is still a challenge.

Chitosan is a natural polysaccharide found in the shells of marine crustaceans, a common sea food waste. The proper disposal of these sea food wastes is a continuous problem. They create major environmental concern associated with ground and drinking water pollution. Chitosan, a bio waste, can be used as an eco-friendly candidate for coating purposes because of its excellent film forming tendency, low cost, most plentiful abundance in nature, biodegradable and non-toxic nature. The film forming nature of chitosan can be used to design barrier coatings for corrosion resistance of active metals as it forms complexes with metal ions and also adheres to negatively charged surfaces. However, chitosan is prone to absorb moisture leading to the failure of the coating on prolong exposure to hostile environments. A few investigations have been carried out to decrease the hydrophilicity and to improve bond strength of chitosan to its substrate. However, these measures are not sufficient for long term corrosion protection of active metals.

Conjugated polymers are reported as corrosion inhibitors for some active metals and alloys. However, mechanical integrity and thermal stability of these polymer based coatings are low. The interaction of chitosan and conjugated polymers like polyaniline, polypyrrole has been reported earlier. The synergistic effect of chitosan and polypyrrole is reported to reduce the size and improve the solubility of polypyrrole. In view of this, chitosan and polypyrrole system can be explored as corrosion resistant coatings for metals like mild steel. However, the potential of chitosan-polypyrrole composite as a corrosion resistant coating material is not studied well.

Organic/inorganic composites have attracted academic and industrial interest in recent years. These composites are organic polymers with inorganic fillers, which significantly improve the properties of the polymer. Therefore, these composites can be explored as coating material having superior properties. Polyaniline/SiO2 composite coatings have been reported to enhance the corrosion resistance of steel substrates. Incorporation of SiO2 particles as filler in the polymer matrix has shown significant impact on thermal and mechanical properties of the coatings. Silica (SiO2) has a large surface area and smooth non-porous surface. This feature promotes contact between SiO2 (as filler) and the polymer matrix. However, the chemically synthesized polymer composites are difficult to apply as coatings because of their non-solubility in common organic solvents.

Conventional polymer coating like epoxy is known to have superior characteristics as compared to regular paints due to its good scratch resistance and adhesion to metal surface. However, epoxy coating alone is not sufficient to protect the underlying metal and fails due to cathodic disbondment under harsh environmental conditions over prolonged exposure. Literature shows the use of SiO2 particles as reinforcement for anti-corrosive epoxy coatings. The particles moderately improve the corrosion resistance properties of epoxy coatings in aggressive medium. However, very limited work is reported on epoxy paints containing polyaniline and polypyrrole as anticorrosive additives.

Reference may be made to US patent 20080305341 which relates to coating of metallic surfaces with an anti corrosive coating containing conductive polymers in particulate form with a binder. The conductive polymers used were polyphenylene, polyfuran, polyimidazole, polyphenanthrene, polypyrrole, polythiophene and polythiophenylene. The conductive polymers were doped with anti corrosive mobile anions say, $ZrF_6^{2-}$, $CeO_4^{4-}$, $MnO_4^{-}$, $MnO_4^{2-}$, $MoO_4^{2-}$, $MoO_4^{4-}$, $VO_4^{2-}$, $WO_4^{2-}$. The conductive polymer coats the metallic surface and is also dried. A second composition containing a binder system is then applied as a dispersion (solution, emulsion and/or suspension) to the precoated metallic surface and is dried and optionally also polymerized with conductive polymers charged with anti-corrosive mobile anions. The binders are polycarbonate-polyurethane, polyester-polyurethane, styrene, styrene-vinyl acetate, vinyl acetate, vinyl ester and/or vinyl ether. However, the drawbacks thereof include that these coatings use toxic mobile anions and the use of polymer first on the surface followed by coating with binders.

Reference may be made to U.S. Pat. No. 6,756,123 which relates to an anticorrosion paint for preventing steel materials from corrosion by using polyaniline as an anticorrosion pigment. The anticorrosion paint has an excellent anticorrosion effect, long persistence of the anticorrosion effect, high durability and superior coating property controlling the anticorrosion effect, without using metal causing environmental pollution as an anticorrosion pigment. The invention provides a coated steel substrate comprising an anticorrosion paint system, wherein the paint system comprise a primer coat paint layer and a top coat paint layer: a primer coat paint layer including 3 to 49 weight percent (wt %) of the polyaniline, 40 to 86 wt % of the matrix resin, 1 to 47 wt % of the additives and 10 to 56 wt % of the mixed solvent; and a top coat paint layer for protecting for protecting the primer coat paint layer and improving the anticorrosion effect, the top coat paint layer including 40 to 89 wt % of matrix resin, 5 to 54 wt % of colored pigment, 1 to 50 wt % of additives and 5 to 54 wt % of mixed solvent. Epoxy resin or acrylic urethane resin was employed as the resin. Titanium oxide, iron oxide, phthalocyanine blue or phthalocyanine green, was used as inorganic or organic pigments. Xylene, toluene, methyl isobutyl ketone, butyl acetate, ethyl acetate, cellosolve acetate, ethyl cellosolve, n-butanol, isobutanol, isopropylalcohol, methyl ethyl ketone, cyclohexanone, methanol or diacetone alcohol were used as solvents. The said anticorrosion paint plays a role in exerting persistently the excellent anticorrosion effect without causing environmental problem. However, the drawbacks thereof include a loading of higher concentration of polyaniline with higher concentration of dopant is a limiting factor for its practical application. Moreover these coatings does not show self-healing characteristic.

Reference may be made to CN 102702920 which discloses a water dispersible polyaniline anti-corrosive coating and preparation method thereof. The invention claims a water dispersible polyaniline anti-corrosive coating which is a green environmental friendly anticorrosion coating and has excellent antiseptic property. The paint comprises a component A and a component B, wherein the component A comprises of epoxy resin, aqueous film-forming co solvent, deionized water, polyaniline nano fiber powder, filler, non-ionic surfactant, defoaming agent, aqueous dispersant; and the component B comprises aqueous curing agent, deionized water and leveling agent. The aqueous polyaniline anti-corrosive paint is a green and environment-friendly type anti-corrosive paint and has an excellent anti-corrosive property. However, the drawbacks thereof include the polymer polyaniline which is showing anti corrosive property in the above invention but does not show self-healing characteristic.

Reference may be made to CN 102101962 which recites a polyaniline epoxy anticorrosive dope and its preparation method. The coating comprises component a, Epoxy resin, mixed solvent, polyaniline nanometer composite material and Component b is comprised of amine firming agent, ethanol without water. The toluene and xylene the invention claims a n-butyl alcohol isobutyl alcohol and tertiary butyl alcohol the invention claims a mixed into mixing solvent the component a and b according to weight ratio of 1:0.5-1.2 mixing and stirring 0.5-1 h can. Whole coating material system the mechanical property of the aging resistant performance corrosion resistant performance is improved obviously the metal surface passivation form a layer of compact stable oxidation film it prevents the metal is further oxidized However, the drawbacks thereof include that the polymer does not show self-healing characteristic.

Reference may be made to CN 102352179 which relates to a preparation method of a polypyrrole anticorrosion coating on the metal surface. The method is characterized in that: a monomolecular film of a pyrrole derivative with two functional groups is self-assembled on the metal material surface, one functional group pyrrole of the monomolecular film is polymerized with pyrrole, and an obtained polypyrrole film which is chemisorbed on the metal material surface is not easy to peel and has an anticorrosion effect. The method, which allows the film which is compacter than common synthesized polypyrrole films to be generated on the metal material surface, allows the penetration of corrosion ions to the coating to be effectively obstructed in a long term, the metal corrosion potential to be improved and the corrosion current to be reduced; and the preparative coating which has the advantages of high adhesion, uneasy peeling, and uneasy scratch because of compactness allows the metal material corrosion to be avoided. However, the drawbacks thereof include the coating to be anticorrosive but the coating does not have the formulation as detailed in our patent application.

Reference may be made to CN 101864239 B which claims a hyper-branched epoxy resin and the polypyrrole composite anticorrosive paint and preparation method thereof. The hyperbranched epoxy resin/polypyrrole composite anticorrosive paint is prepared by simply mixing the component A and the component B according to the proportion and curing at 80 DEG C when in use. The anticorrosive paint prepared in the invention has excellent anticorrosive performance as well as physical and mechanical properties and is environment-friendly. However, the drawbacks thereof include that the patent does not report the life of the coating under severe conditions.

Reference may be made to EP 1723270 which recites a method for protecting a metal surface from galling and corrosion, which includes a step of providing a protective dry film on the metal surface. The film includes a solid lubricant and a conducting polymer, the conducting polymer having lubricant properties and being capable of binding the solid lubricant to the metal surface. Threaded metal joint surfaces coated with the film are capable of resisting galling under high pressure and high torque conditions, even after several fastening and unfastening operations or over a long period of time. Protection from corrosion is also provided by the film. The method and film are economical in that only a single layer of protective compound need be applied in order to provide metal surfaces with both lubrication and protection against corrosion, and problems such as removal or leakage, which are associated with protective compounds that use oils, are avoided. Additionally, the dry film is advantageous because it does not contain heavy metals that are harmful to the environment. However, the drawbacks thereof include that the patent does not report how the coating of conducting polymer with lubricant will behave in hazardous toxic conditions and does not show any smart action Reference may be made to EP 1779392 which discloses a process for coating fine particles on surfaces, in which the feed mixture contains: at least one monomer and/or at least one oligomer selected from monomers and/or oligomers of aromatic compounds and/or unsaturated hydrocarbon compounds suitable for forming an electroconductive oligomer, polymer, copolymer, block copolymer or graft copolymer; at least one type of anions which (1) are and/or can be incorporated as doping ions into the structure of the conductive polymer; (2) can be discharged from said structure in the event of a potential fall of the conductive polymer (reduction); and (3) can have an anti-corrosive effect in the presence of a metallic surface; at least one type of particles; if necessary, at least one oxidizing agent and water and/or at least another solvent. A coating is formed from the feed mixture on the particle surface, the feed mixture being converted by oxidation into a conductive polymer in the presence of at least one type of mobile anti-corrosive anions. Alternatively, the fine particles are coated with a product mixture that contains a conductive polymer. However, the drawbacks thereof include the patent application does not speak about the suitability of coatings on metal surface in critical conditions and its mechanism.

Reference may be made to U.S. Pat. No. 6,762,238 which describe a coating composition containing a polymeric complex between polyaniline and a polymeric ion. In addition to the said polymeric complex, the composition contains a water-dispersable binder. The composition is useful as a water-borne paint to be applied onto a metal substrate electrophoretically or non-electrophoretically. However, the drawbacks thereof include the use of water borne polymeric complex which may lose its adherence to the metal surface under vigorous salt spray conditions.

Reference may be made to U.S. Pat. No. 8,298,350 which describes preparation of chromium-free conversion coating by the addition of inorganic salts to dispersions of conducting polymers which are then exposed to alloys of aluminum or other metals. The performance of the coating is comparable to that of known Cr (chromium)-based methods for a number of aluminum alloys having particular significance in the manufacture of aircraft. However, the drawbacks thereof include its specific application to Aluminum and its alloys but does not provide smart action under vigrous conditions.

Reference may be made to U.S. Pat. No. 5,993,695 which relates to an aqueous coating dispersion comprising at least electrically conductive particles, which particles comprise at least a first binder, a conductive polymer and a non-ionic stabilizer, characterized in that the coating dispersion contains 50 to 99 wt. %, relative to the total amount of solids present, of a second binder, which second binder does not form part of the electrically conductive particles. The invention also relates to a process for the preparation of the aqueous coating dispersion and use thereof in an anticorrosive paint, to the anticorrosive paint based on the aqueous coating dispersion according to the invention and to the metals protected herewith. However, the drawbacks thereof include higher percentage of polymer binder which will strongly affect corrosion prevention and does not have any self healing mechanism.

Thus, keeping in view the drawbacks of the hitherto reported prior art, the inventors of the present invention realized that there exists a dire need to provide self-healing smart coatings capable of imparting corrosion resistance in marine conditions while being low cost, environment friendly, having excellent finish and which are prepared without any emission of volatile organic compounds (VOCs).

OBJECTS OF THE INVENTION

The main objective of the present invention is thus to provide self-healing anti corrosive coatings which obviate the drawbacks of the hitherto reported prior art.

Another objective of the present invention is to provide anti corrosive coatings comprising conducting polymers, SiO2, chitosan along with epoxy.

Yet another object of the present invention is to provide anti corrosive coatings which exhibit anti corrosive effect in marine conditions.

Still another object of the present invention is to provide coatings comprising conducting polymer embedded with filler materials and synthesized in a specific medium, which when embedded with epoxy and powder coated on mild steel surfaces acts as barrier for corrosion and gives a corrosion inhibition efficiency of the order of >99% when exposed to highly saline conditions upto 5.0% NaCl.

Yet another object of the present invention is to provide composites which cause significant improvement in the corrosion resistance of coatings.

Still another object of the present invention is to provide coatings wherein the synergy of chitosan-polypyrrole inhibits the diffusion of chloride ions and SiO2 particles as filler reinforce the corrosion resistance of the coating.

SUMMARY OF THE INVENTION

The present invention provides self-healing conducting polymer coatings polymerized on silica and chitosan particles in the presence of suitable doping medium which are useful for corrosion prevention when mixed with epoxies in different weight ratios and powder coated on mild steel samples. Tafel plots exhibits significantly high corrosion protection efficiency (99.99%) for the epoxy coatings with 2.0 wt % loading of chitosan-polymer composite. The weight loss measurements and salt spray test results clearly exhibit superior corrosion resistance offered by coatings with chitosan-polymer composite. The synergistic interaction between chitosan and polypyrrole in the composite is expected to improve the corrosion resistance properties of the coatings. The SiO2 particles present in the composite reinforce the integrity of the coating under corrosive conditions Accordingly, the present invention provides a process of synthesizing conducting polymers on filler materials like silica and fly-ash in a specific medium of inorganic/organic acid medium consisting of per fluoro octoanic acid and the like. The method comprising:

Synthesis of conducting polymer like polypyrrole, polyaniline and the like on silica and fly-ash particles by emulsion polymerization in the presence of chitosan using sodium lauryl sulfate, sodium para-toluene sulphonate, per-fluoro octaonic acid and the like.

Mixing the polymer in different ratios of epoxy and doing powder coating on mild steel substrates by powder coating technique.

Testing the polymer coated mild steel surfaces under hostile conditions of 3.5% NaCl Checking the performance of the coating by Tafel plots and polarization studies Testing the coating under accelerated conditions as per ASTM standards B117D In an embodiment, the present invention provides a process for the preparation of self-healing anti corrosive coating composition as claimed in claim 1, wherein the steps comprising the synthesis of mono dispersed uniform sized SiO2 particles were carried out by hydrolysis of tetra-ethyl orthosilicate (TEOS) in ethanol using ammonia as a catalyst. Chitosan-polypyrrole-SiO2 composites were synthesized by chemical polymerization of pyrrole in presence of 1.0 wt % chitosan solution (in acetic acid). For this, a mixture of 1 gm chitosan (Cs), 1 gm acetic acid and 99 gms of deionized water was stirred till a clear pale solution (pH ~3) of chitosan acetate appears. The synthesized silica particles were dispersed in the chitosan acetate solution followed by addition of sodium salt of p-toluene sulphonate (p-TS). This suspension was allowed to stir for 30 minutes. Chitosan interacts with anionic surfactants by electrostatic attraction to form soluble complexes. Thereafter, pyrrole was introduced followed by drop by drop addition of freshly prepared FeCl3 to initiate the polymerization of pyrrole. The molar ratio of FeCl3:pyrrole:p-TS was taken to be 2:1:0.5. The resultant composite was filtered and washed with water and ethanol to remove oligomers and oxidant. Thereafter, it was dried in a vacuum oven at 600 C.

In another embodiment, the present invention provides self-healing anti corrosive coating comprising 1 to 5 wt % silica, 1 to 5 wt % chitosan, 4 to 20 wt % monomer and 95 to 99 wt % epoxy.

In yet another embodiment of the invention, the conducting polymer is selected from the group consisting of polypyrrole and polyaniline and copolymer of aniline and anisidine.

In still another embodiment of the invention, the filler material taken for polymerization is selected from silica fly-ash and the like.

In yet another embodiment of the invention, the doping medium is chosen from per-fluoro octaonic acid, o-phosphoric acid, sodium lauryl sulphate and the like.

In still another embodiment of the invention, the oxidant is ammonium persulphate or potassium persulphate, ferric chloride and the like.

In yet another embodiment of the invention, the temperature of the polymerization was kept between 0 to 5 degree C.

In still another embodiment of the invention, the epoxy resin used for the preparation of the smart coatings has the following composition: resin {epoxy (bisphenol A)+polyester} (70%), Flow agent (D-88) (2.3%), degassing agent (benzoin) (0.7%), fillers ($TiO_2$ and $BaSO_4$) (27%).

In yet another embodiment of the invention, the substrate used for coating purpose was low carbon mild steel. The steel sheets were cut to a dimension of 10 mm×45 mm×2 mm and 150 mm×100 mm×2 mm for corrosion studies and salt spray tests, respectively. To carry out bend test, steel sheet of thickness 0.8 mm was used.

In a further embodiment of the invention, the filler to monomer ratio was kept between 1-5%.

In another embodiment of the invention, the oxidant to monomer ratio was kept between 2-1.

In yet another embodiment of the invention, the ratio of doping medium to monomer was kept between 3 to 1.

In still another embodiment of the invention, the polymerization reaction time was kept between 4 to 6 hours.

In yet another embodiment of the invention, the polymer composite containing all filler constituents obtained after filtration was dried in vacuum oven at 50 to 60 degree C.

In still another embodiment of the invention, the polymer obtained after drying was mixed with epoxy in the range of 1 to 6:99 to 94.

In yet another embodiment of the invention, the mild steel surfaces were coated with epoxy mixed with polymers by powder coating technique.

In still another embodiment of the invention, the powder coated samples were kept in oven at 140 to 160 degree C.

In yet another embodiment of the invention, the powder coated mild steel samples were tested by Tafel plots in saline water having 3.5 to 5.0% NaCl concentration and under accelerated conditions as per ASTM standards.

BRIEF DESCRIPTION OF THE ACCOMPANYING DRAWINGS

FIG. 1: Schematic representation of the synthesis of chitosan/polypyrrole/$SiO_2$ composites.

Figure 2:
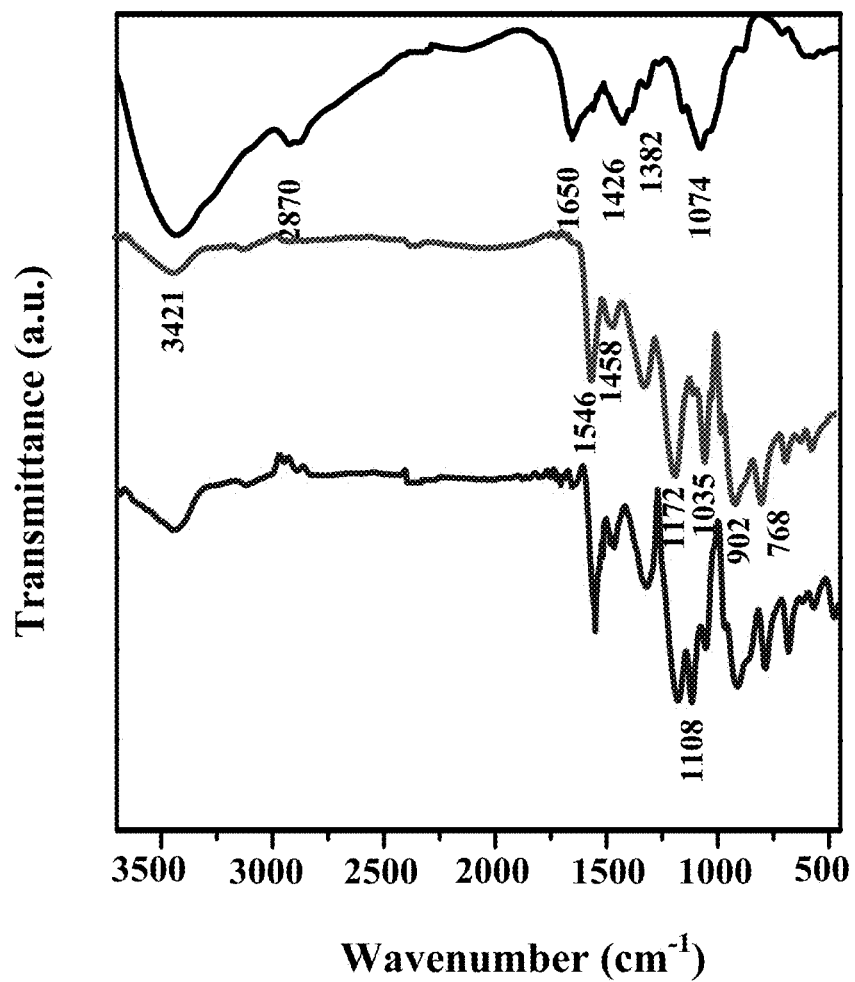

FIG. 2: FTIR spectra of chitosan (—) chitosan-polypyrrole composite (——) and chitosan-polypyrrole-$SiO_2$ composite (——).

Figure 3:
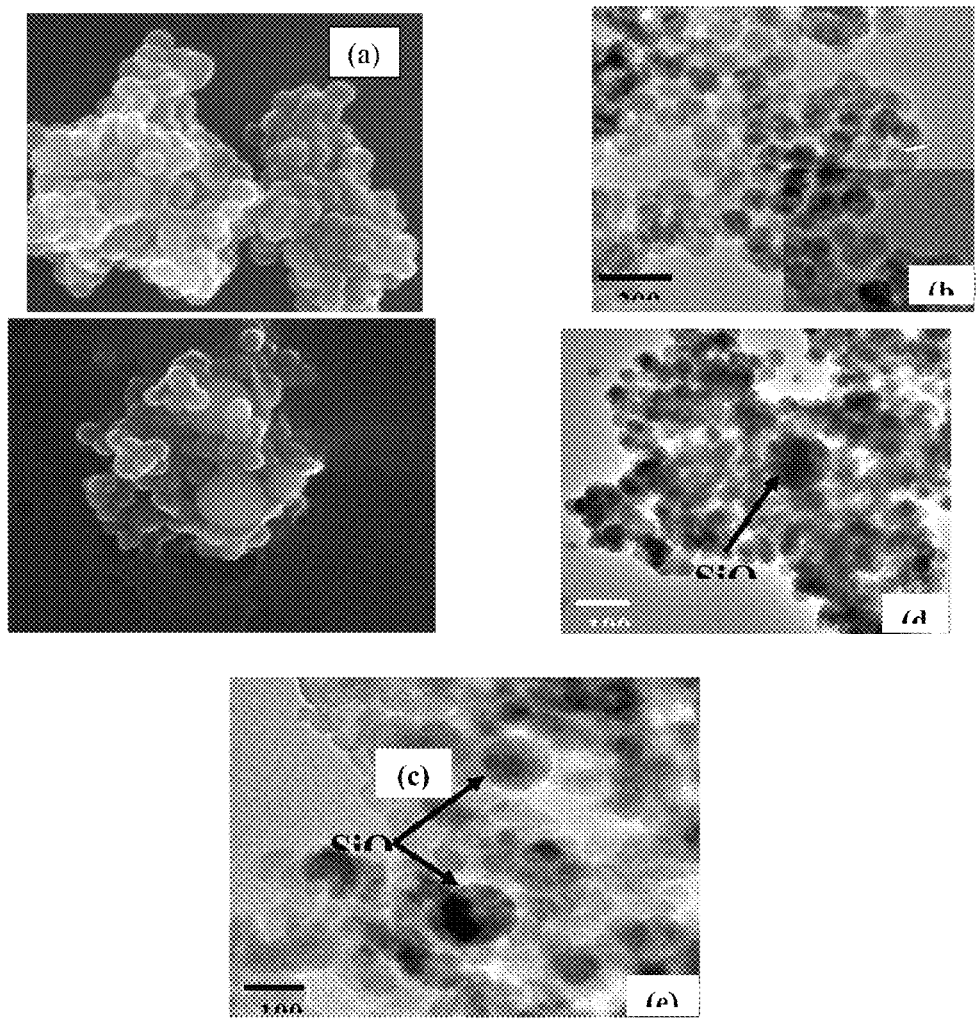

FIG. 3: FESEM (a) and TEM (b) micrographs of chitosan-polypyrrole composite show distinct particles having spherical morphology. FESEM (c) and TEM (d) micrographs of chitosan-polypyrrole-$SiO_2$ composite showing embedded $SiO_2$ particles in the polymer matrix. TEM micrograph of (e) polypyrrole-$SiO_2$ composite (without chitosan).

Figure 4:
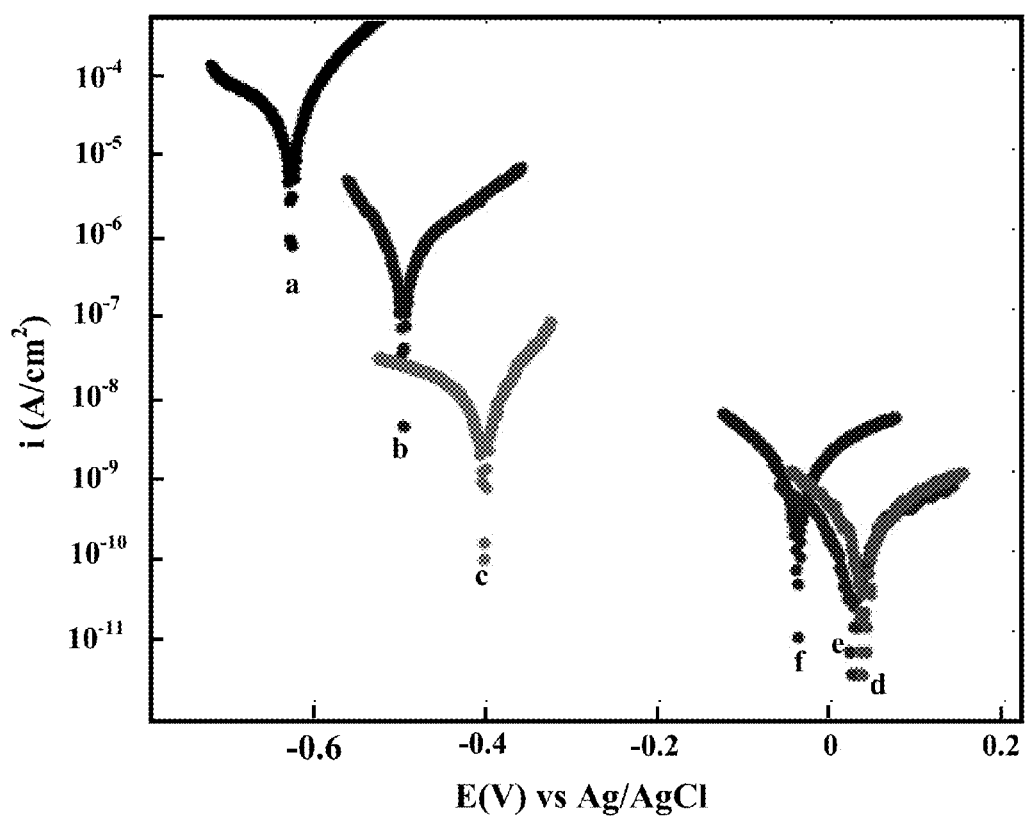

FIG. 4: Photographs of (a) epoxy coated and epoxy with (b) 1.0 wt %, (c) 2.0 wt %, (d) 3.0 wt % loading of polypyrrole/$SiO_2$/chitosan composite (PCs) coated mild steel specimens exposed to salt spray fog after 65 days.

Figure 5:
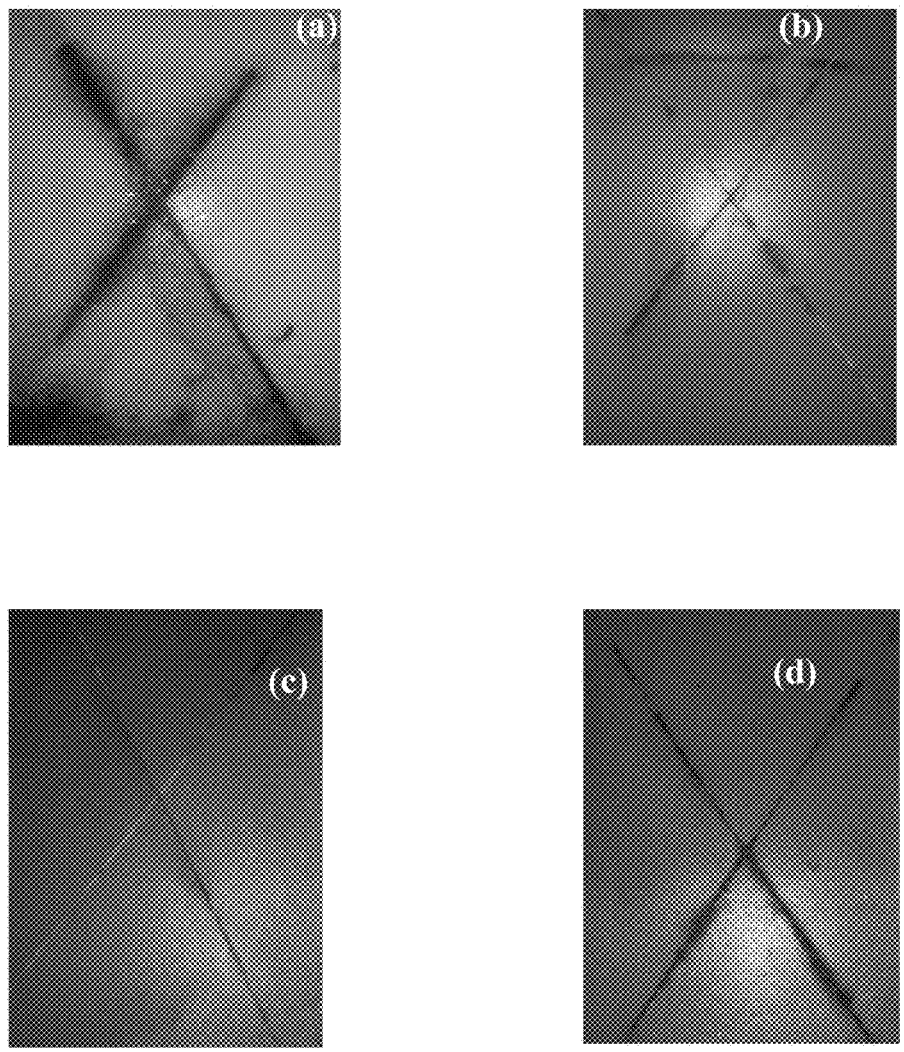

FIG. 5: Tafel plots of (a) epoxy coated and epoxy with (b) 1.0 wt %, (c) 2.0 wt %, (d) 3.0 wt % chitosan/polypyrrole/$SiO_2$/chitosan composite, (e) polypyrrole/$SiO_2$ chitosan composite coated mild steel specimens in 3.5% NaCl solution at room temperature (25+3° C.).

Figure 6:
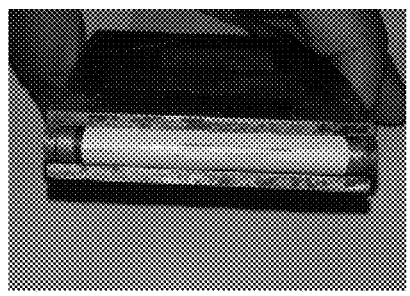
Figure 6:
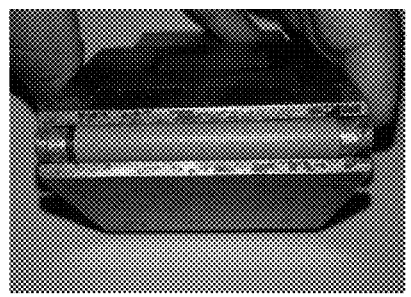
Figure 6:
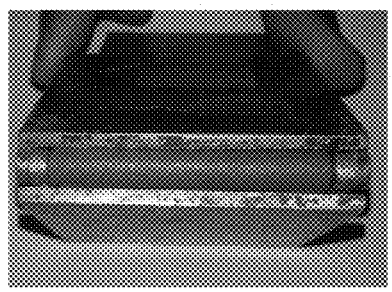
Figure 6:
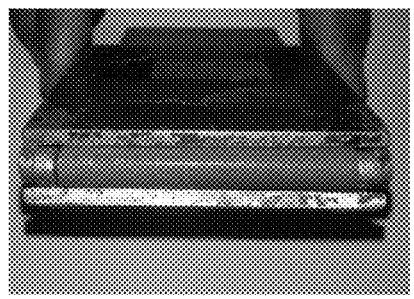

FIG. 6: Photographs of the surface of (a) epoxy coated and epoxy with (b) 1.0 wt %, (c) 2.0 wt % and (d) 3.0 wt % loading of chitosan-polypyrrole-$SiO_2$ coated steel panels subjected to bend test (at 175°).

Figure 7:
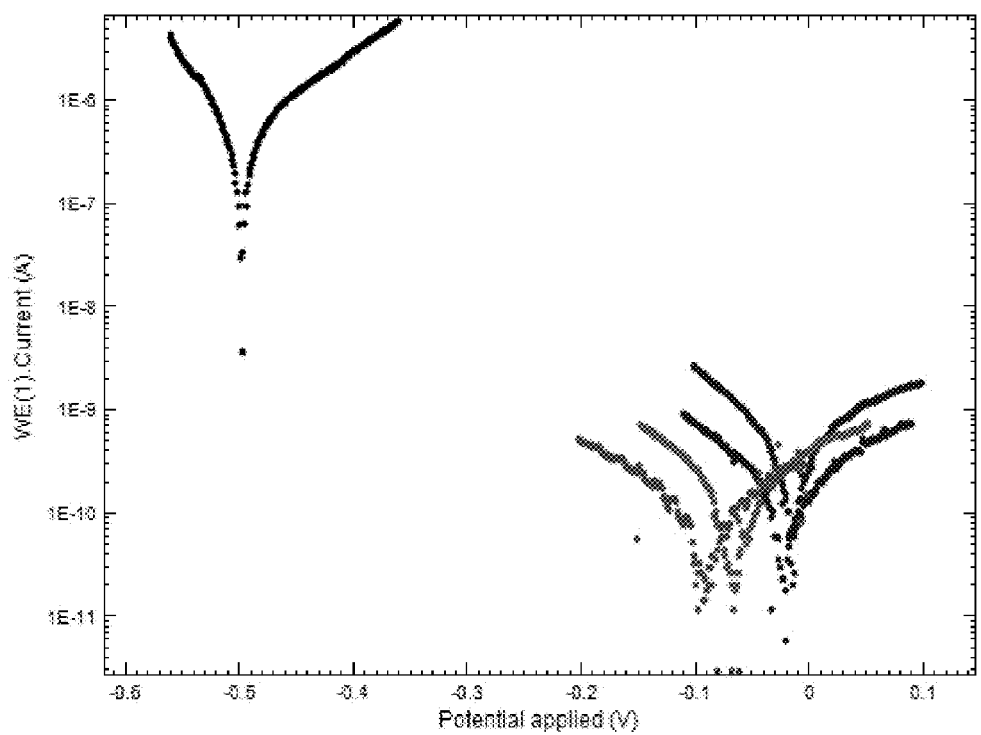

FIG. 7: Tafel plots of (a) epoxy coated and epoxy with (b) 1 wt %, (c) 2 wt %, (c) 3 wt % and 4 wt % loading of copolymer of (aniline+anisidine)/$SiO_2$ composite coated mild steel specimens in 3.5% NaCl solution at room temperature (25+3° C.).

Figure 8:
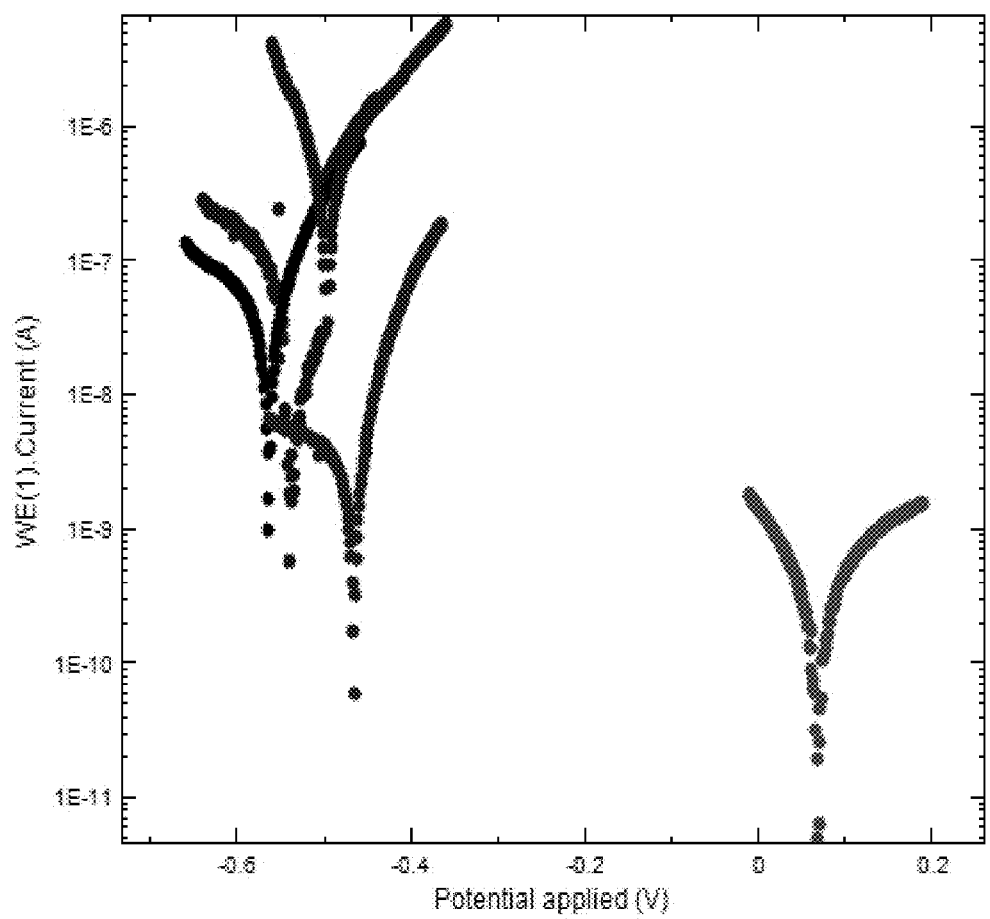

FIG. 8: Tafel plots of (a) epoxy coated and epoxy with (b) 1.0 wt %, (c) 2 wt %, (d) 3 wt % and 4 wt % loading of copolymer of (aniline+phenetidine) composite coated mild steel specimens in 3.5% NaCl solution at room temperature (25+3° C.).

DETAILED DESCRIPTION OF THE INVENTION

In this study, chitosan-polypyrrole-$SiO_2$-epoxy composites were synthesized to design corrosion resistant coatings for mild steel substrates. The developed composites exhibit improved thermal stability due to the presence of $SiO_2$ as filler and its synergistic interaction with chitosan and polypyrrole. The FESEM and TEM images evidenced the presence of $SiO_2$ particles embedded in the polymer matrix. The performance of composite coating was established from the results of Tafel polarization, impedance, weight loss and salt spray test. In all these studies, chitosan-polypyrrole-$SiO_2$-epoxy composites exhibited significantly high corrosion resistance as compared to polypyrrole-$SiO_2$ (without chitosan) and chitosan-polypyrrole (without $SiO_2$) composites. The synthesized composites were presumed to provide dual protection to the underlying metal. The polymer acts as an effective barrier layer and passivates the metal, whereas the $SiO_2$ as filler inhibits the degradation of coating under extremely corrosive conditions.

The present invention provides a simple method to utilize chitosan, a bio waste to synthesize chitosan-polypyrrole-$SiO_2$ composites along with epoxy so as to result in coatings having superior corrosion resistance. In order to evaluate the role of chitosan, the corrosion studies of polypyrrole-$SiO_2$ composite (without chitosan) were also carried out. The crucial role of $SiO_2$ was analyzed by carrying out corrosion studies of chitosan-polypyrrole composites (without $SiO_2$). Coatings were developed by loading the composites in different wt % in epoxy powder coating formulations. Powder coating technique was utilized as it is a facile process with low cost, excellent finish and almost no emission of volatile organic compounds (VOCs).

The synthesis of mono dispersed uniform sized $SiO_2$ particles were carried out by hydrolysis of tetra-ethyl orthosilicate (TEOS) in ethanol using ammonia as a catalyst. Chitosan-polypyrrole-$SiO_2$ composites were synthesized by chemical polymerization of pyrrole in presence of 1.0 wt % chitosan solution (in acetic acid). For this, a mixture of 1 gm chitosan (Cs), 1 gm acetic acid and 99 gms of deionized water was stirred till a clear pale solution (pH ~3) of chitosan acetate appears. The synthesized silica particles were dispersed in the chitosan acetate solution followed by addition of sodium salt of p-toluene sulphonate (p-TS). This suspension was allowed to stir for 30 minutes. Thereafter, pyrrole was introduced followed by drop by drop addition of freshly prepared FeCl3 to initiate the polymerization of pyrrole. The molar ratio of FeCl3:pyrrole:p-TS was taken to be 2:1:0.5. The resultant composite was filtered and washed with water and ethanol to remove oligomers and oxidant. Thereafter, it was dried in a vacuum oven at 600 C. Mild steel specimens were polished metallographically by grinding with emery papers of 120, 600 and 800 grit size to attain a smooth finish, prior to the coating treatment. The powder coating formulations were prepared by blending composites in epoxy resin. A homogenous mixture of well dispersed composites in epoxy was obtained after ball milling. The coatings were applied on mild steel specimens using an electrostatic spray gun held at 67.4 KV potential with respect to the substrate (grounded). The powder coated mild steel specimens were cured at 150° C. for 30 minutes. The adhesion of the coating was tested by cross cut adhesion test and bend test as per IS101 Part V Sec (2). The steel specimens coated with epoxy coating is designated as EC and epoxy with different wt % loading of chitosan-polypyrrole-SiO2 are coated and tested for salt spray tests and tafel plot measurements.

EXAMPLES

The following examples are given by way of illustration and therefore should not be construed to limit the scope of the present invention.
Test Materials
Pyrrole (Acros Organics, 98%) was distilled and stored under nitrogen at 4 degree C. prior to use. Chitosan, with a degree of deacetylation 90% was a fine pale yellow powder (100 mesh) commercially procured from M/s Chemsworth, India vide catalogue No. 9012-76-4. The epoxy resin used for the preparation of the smart coatings has the following composition: resin {epoxy (bisphenol A)+polyester} (70%), Flow agent (D-88) (2.3%), degassing agent (benzoin) (0.7%), fillers (TiO2 and BaSO4) (27%). The substrate used for coating purpose was low carbon mild steel. The steel sheets were cut to a dimension of 10 mm×45 mm×2 mm and 150 mm×100 mm×2 mm for corrosion studies and salt spray tests, respectively. To carry out bend test, steel sheet of thickness 0.8 mm was used.

Example 1

Synthesis of chitosan-polypyrrole-SiO2 Composite

The synthesis of mono dispersed uniform sized SiO2 particles were carried out by hydrolysis of tetra-ethyl ortho-silicate (TEOS) in ethanol using ammonia as a catalyst. Chitosan-polypyrrole-SiO2 composites were synthesized by chemical polymerization of pyrrole in presence of 1.0 wt % chitosan solution (in acetic acid) as shown in FIG. 1. For this, a mixture of 1 gm chitosan (Cs), 1 gm acetic acid and 99 gms of deionized water was stirred till a clear pale solution (pH ~3) of chitosan acetate appears. The synthesized silica particles were dispersed in the chitosan acetate solution followed by addition of sodium salt of p-toluene sulphonate (p-TS). This suspension was allowed to stir for 30 minutes. It is reported that chitosan interacts with anionic surfactants by electrostatic attraction to form soluble complexes. Thereafter, pyrrole was introduced followed by drop by drop addition of freshly prepared FeCl3 to initiate the polymerization of pyrrole. The molar ratio of FeCl3:pyrrole:p-TS was taken to be 2:1:0.5. The resultant composite was filtered and washed with water and ethanol to remove oligomers and oxidant. Thereafter, it was dried in a vacuum oven at 600 C.

Example 2

Development of Coatings

Mild steel specimens were polished metallographically by grinding with emery papers of 120, 600 and 800 grit size to attain a smooth finish, prior to the coating treatment. The powder coating formulations prepared in example 1 were blended with epoxy resin. A homogenous mixture of well dispersed composites in epoxy was obtained after ball milling. The coatings were applied on mild steel specimens using an electrostatic spray gun held at 67.4 KV potential with respect to the substrate (grounded). The powder coated mild steel specimens were cured at 150° C. for 30 minutes. The adhesion of the coating was tested by cross cut adhesion test and bend test as per IS101 Part V Sec(2). The steel specimens coated with epoxy coating were designated as EC, epoxy with 1.0 and 2.0 wt % loading of polypyrrole-SiO2 composite coatings as PS1 and PS2 respectively. The epoxy coating with 2.0 wt % loading of chitosan-polypyrrole composite were designated as (CP) and epoxy with different wt % loading of chitosan-polypyrrole-SiO2 composite coatings as CsPC1 (1.0%), CsPC2 (2.0%) and CsPC3 (3.0%) in text, figures and tables.

Example 3

Characterization of the Polymer Composites

The Morphology and elemental analysis of the composites were conducted using FESEM (NOVA NANO SEM 430, FEI, USA) coupled with energy dispersive X-ray spectrometer (EDS). TEM (Tecnai TMG F30, FEI) was employed to analyze the size and distribution of SiO2 particles in the polymer matrix. FTIR spectra (Model-Nicolet 5700) were recorded in the spectral range of 4000-600 cm-1 to analyse the chemical structure of the composite. X-ray diffractograms (XRD) were obtained using Bruker, D-8 advanced diffractometer, operating with CuKα radiation ($\lambda$=0.154 nm) generated at a voltage of 35 kV and current of 30 mA at a scan rate of 1°/min. Thermogravimetric analysis (TGA) and Differential Scanning calorimetry (DSC) were performed using a Mettler Toledo TGA/SDTA 851 and DSC822e, respectively with a heating rate of 15° C. min-1 in nitrogen atmosphere. FESEM and TEM micrographs of the chitosan-polypyrrole composite (CP) reveals a clustered structure composed of spherical nano particles (diameters ~40-50 nm) of polypyrrole and chitosan arranged in a regular pattern. It is reported that the polymerisation of pyrrole in absence of chitosan forms polypyrrole particles having diameters 100-150 nm with aggregated cauliflower morphology. However, the in-situ chemical polymerisation of pyrrole in presence of chitosan results in the formation of much smaller polypyrrole nano spheres (40-60 nm). Here, chitosan acts as a steric stabiliser and hinders the formation of large size polypyrrole particles. Further, the FESEM and TEM micrographs of chitosan-polypyrrole-SiO2 composite show the presence of SiO2 particles embedded in chitosan-polypyrrole matrix. The EDS analysis of the composite evidenced the presence of elements, Carbon (45.6%), Nitrogen (3.1%), Oxygen (22.6%) and Silicon (35.6%). For comparative studies, the TEM micrograph of polypyrrole-SiO2 composite (without chitosan) is also shown.

Example 4

Electrochemical Characterization of the Coatings

Open Circuit Potential (OCP) vs time, Tafel polarization and Electrochemical Impedance Spectroscopy (EIS) were employed for electrochemical characterization of the coatings. A traditional three electrode cell system using Autolab Potentiostat/Galvanostat, PGSTAT100 (NOVA Software) was used to perform the measurements. In three electrodes cell assembly, coated steel specimens (1 cm2 area exposed) were taken as working electrodes, Pt as counter electrode and Ag/AgCl electrode as reference electrode. The test specimens were kept in 3.5% NaCl solution under open circuit potential (OCP) conditions for 1 h, prior to the electrochemical tests. Tafel plots were obtained by carrying out potentiodynamic polarisation at a constant scan rate of 1 mV/sec by sweeping the potential between +100 mV to −100 mV vs Ag/AgCl from Ecorr. The values of corrosion current density (icorr), corrosion potential (Ecorr), anodic ($\beta$a) and cathodic ($\beta$c) Tafel constants were extracted from Tafel plots by curve fitting method. The corrosion protection efficiency (% P.E.) was determined from the measured corrosion current densities {corrosion current density of epoxy coatings with composites (iccorr) and corrosion current density of epoxy coatings (i0corr)} values by using Equation (1).

$$P.E. (\%) = i^0_{corr} - iccor/i^0_{corr} \times 100 \qquad (1)$$

Impedance measurements were performed in a frequency range of 100 KHz to 0.1 Hz at OCP by applying a sine potential signal of 10 mV. Different parameters related to impedance analysis like pore resistance ($R_{pore}$) and coating capacitance ($C_c$) were measured by fitting ore, suitable equivalent circuits. Each experiment was repeated thrice to check the reproducibility of the results. Tafel plots were also obtained for epoxy coating and epoxy with different wt % loading of polymer composite coatings with an artificial defect (diameter=0.7 mm), by sweeping the potential between +250 mV vs Ag/AgCl from $E_{corr}$ in 3.5% NaCl solution. For this, a small hole was drilled through the coating into the steel, which leaves the steel surface directly exposed to the electrolyte. The study was conducted to obtain electrochemical data for test specimens with significant coating damage. The weight loss method was also employed to measure the corrosion resistance of the coatings under freely corroding conditions. For this, steel specimen of dimension 8×3.5 cm$^2$ were immersed in 3.5% NaCl solution for 60 days. The test specimens were weighed in an electronic balance with an accuracy of 0.1 mg before and after immersion in saline medium. The performance of the coating was examined visually and through calculation of the weight loss. Weight loss (W.L.) is expressed as the difference in the weight of the samples before immersion and after immersion, ($w_0-w_1$). Here, $w_0$=weight of the sample before immersion (mg), $w_1$=weight of the sample after immersion (mg). Corrosion rate (C.R.) in mm/year is calculated using weight loss method by putting density of the metal, d (g/cm$^2$), surface area of specimen, a (cm$^2$) and end time, t (h) as mentioned in Equation (2).

$$C.R. (mm/y) = (w_0 - w_1) \times 87.6/a.t.d \qquad (2)$$

Salt spray tests were carried out, as per ASTM B117 method by exposing the coated steel panels to salt spray fog containing 5.0% NaCl solution for 65 days. This test was performed to evaluate the corrosion resistance of the coatings under accelerated test conditions.

Example 6

FTIR Studies of the Composites

The FTIR spectrum of chitosan, as shown in FIG. 2 exhibits an intense broad band in the spectral range of 3200-3650 cm$^{-1}$. It is attributed to the axial stretching of O—H and N—H bonds. A small band near 2870 cm$^{-1}$ is due to the C—H stretching vibration. A peak of considerable intensity at 1650 cm$^{-1}$ is assigned to amide I vibration and peaks at 1426 and 1382 cm$^{-1}$ is the result of coupling of C—N axial stretching and N—H angular deformation. The peaks at 1155, 1074 and 1024 cm$^{-1}$ corresponds to the stretching vibration of C—O—C linkage in the glucosamine rings. The FTIR spectrum of chitosan-polypyrrole composite (CP) exhibits a broad band at 3421 cm$^{-1}$ showing the N—H stretching of pyrrole and O—H stretching of chitosan. The characteristic peaks of polypyrrole at 1546 cm$^{-1}$ (C=C benzoic form), 1458 cm$^{-1}$ (C—N stretching) were observed with considerable intensity [24-26]. The peak at 1172 cm$^{-1}$ (S—O stretching) and 1035 cm$^{-1}$ (S—C stretching) confirm the formation of chitosan-polypyrrole composite doped with p-TS. It is important to note that the reported peak for S—O stretching for polypyrrole occurs at 1168 cm$^{-1}$, which has been shifted to 1172 cm$^{-1}$ for the composite. It shows interaction of chitosan and polypyrrole with p-TS. The corresponding peak for amide vibration at 1650 cm$^{-1}$ of chitosan was not observed for the composite. This shows the presence of mainly protonated amino groups as a result of dissolution of chitosan in acetic acid. The other peaks at 902, 768 and 670 cm$^{-1}$ are due to the C—H out of plane deformation vibration of the ring. The peaks remain same for chitosan-polypyrrole-SiO2 composite (CsPC) except the appearance of an additional peak of considerable intensity at 1108 cm$^{-1}$, solely due to the presence of SiO$_2$ in the composite. However, this peak is slightly shifted, as the peak for Si—O—Si stretching in SiO$_2$ occurs at 1080 cm$^{-1}$. The shifting of the peak could be due to the adsorption of chitosan-polypyrrole on the surface of silica particles. It is reported that chitosan provides the formation of active sites for grafting of polypyrrole chains on silica particles and acts as a stabilizer of silica-polypyrrole particles. The FTIR results exhibit strong interaction between chitosan, polypyrrole and silica in the composite.

Example 7

Microstructural Analyses

Microscopy of the Composites

FIG. 3 depicts the FESEM and TEM micrographs of the chitosan composites. The FESEM (FIG. 3a) and TEM (FIG. 3b) micrographs of the chitosan-polypyrrole composite (CP) reveal a clustered structure composed of spherical nano particles (diameter ~40-50 nm) of polypyrrole and chitosan arranged in a regular pattern. It is reported that the polymerization of pyrrole in absence of chitosan forms polypyrrole particles having diameters 100-150 nm with aggregated cauliflower morphology. However, the in-situ chemical polymerization of pyrrole in presence of chitosan results in the formation of much smaller polypyrrole nano spheres (40-60 nm). Here, chitosan acts as a steric stabilizer and hinders the formation of large size polypyrrole particles. Further, the FESEM (FIG. 3c) and TEM (FIG. 3d) micrographs of chitosan-polypyrrole-SiO2 composite show the presence of SiO$_2$ particles embedded in chitosan-polypyrrole matrix. The EDS analysis of the composite evidenced the presence of elements, Carbon (45.6%), Nitrogen (3.1%), Oxygen (22.6%) and Silicon (35.6%). For comparative studies, the TEM micrograph of polypyrrole-$SiO_2$ composite (without chitosan) is also shown in FIG. 3e, which shows the presence of large size polypyrrole particles with diffused morphology. $SiO_2$ particles are noticed to be dispersed in the polymer matrix.

Tafel Plots

Tafel plots (FIG. 4) were drawn for uncoated steel (BS), epoxy coating (EC) and epoxy coatings with different wt % loadings of chitosan-polypyrrole-$SiO_2$ composite (CsPC1 for 1.0%, CsPC2 for 2.0% and CsPC3 for 3.0%) immersed in 3.5% NaCl solution for 1 h. For comparative studies, Tafel plots were drawn for coatings with polypyrrole-$SiO_2$ composite (PS1 and PS2, without chitosan) and chitosan-polypyrrole composite (CP, without $SiO2$). Different electrochemical parameters, such as corrosion current density (icorr), anodic ($\beta a$) and cathodic ($\beta c$) Tafel constants were extracted by extrapolating the anodic and cathodic curves using Tafel extrapolation method (Table 1). From Table 1, it can be noted that the icorr of epoxy coating ($8.4 \times 10^{-7}$ A/cm2) occurs almost two orders of magnitude less than the uncoated steel.

the value of icorr ($5.5 \times 10^{-9}$ A/cm2) was noticed for epoxy coating with 3.0% loading of chitosan-polypyrrole-$SiO2$ composite (CsPC3) (Table 1). Therefore, 2.0 wt % could be the optimum loading of polymer composite in the epoxy resin to get the desired corrosion protection efficiency. The role of $SiO2$ in enhancing the corrosion resistance properties of the coating cannot be ruled out as the icon for specimen CP (epoxy coating with chitosan-polypyrrole composite, without $SiO2$) occurred ($4.44 \times 10^{-9}$ A/cm2) six times higher than specimen CsPC2.

From the above results, it can be inferred that the remarkably high corrosion resistance of epoxy coatings with chitosan-polypyrrole-$SiO2$ composites is due to the synergistic effect of the excellent film forming tendency of chitosan and corrosion inhibition property of polypyrrole. Chitosan helps in the formation of a uniform barrier film, well bonded to the metal surface, whereas the strong oxidative property of polypyrrole provides anodic protection to the steel. Here, chitosan and polypyrrole are added as an additive in the epoxy coating system. However, the role of polypyrrole to intercept electrons at the metal surface and to transport them will affect the corrosion protection behaviour of the coat-

TABLE 1

Different electrochemical parameters obtained by Tafel extrapolation in 3.5% NaCl solution.

| Sample Name | Ecorr (V) | icorr (A/cm2) | $\beta a$ (mV/dec) | $\beta c$ (mV/dec) | Protection Efficiency (% P.E.) |
|---|---|---|---|---|---|
| Bare Surface | −0.62 + 5.6% | $6.2 \times 10{-5}$ + 3.6% | 85.7 + 4.1% | 106.9 + 6.2% | — |
| Epoxy Coated | −0.54 + 5.5% | $8.4 \times 10{-7}$ + 4.5% | 101.8 + 3.7% | 220.8 + 4.2% | 98.64 |
| CsPC1 | 0.03 + 5.2% | $0.9 \times 10{-9}$ + 6.1% | 317.8 + 4.4% | 390.3 + 5.3% | 99.99 |
| CsPC2 | 0.02 + 8.9% | $0.7 \times 10{-9}$ + 6.1% | 406.4 + 7.0% | 1950 + 6.3% | 99.99 |
| CsPC3 | −0.46 + 5.4% | $5.5 \times 10{-9}$ + 6.8% | 366.8 + 6.4% | 1330 + 5.7% | 99.99 |
| PS1 | −0.51 + 5.2% | $1.9 \times 10{-7}$ + 6.1% | 343.3 + 7.3% | 98.2 + 6.9% | 99.69 |
| PS2 | −0.42 + 8.9% | $1.8 \times 10{-8}$ + 6.1% | 710.1 + 9.2% | 129.0 + 8.3% | 99.97 |
| CP | −0.41 + 9.8% | $4.4 \times 10{-9}$ + 10.2% | 324.5 + 8.6% | 585.6 + 9.2% | 99.99 |

The measurement of less icon for epoxy coating shows its good barrier property towards diffusive ions. The icon reduced further with the addition of polypyrrole-$SiO2$ composites. The observed icon for specimens PS1 ($1.9 \times 10^{-7}$ A/cm2) and PS2 ($1.8 \times 10^{-8}$ A/cm2) was found to be four times and almost two orders of magnitude less, respectively than specimen EC. The reduced icon values of the epoxy coatings with polypyrrole-$SiO2$ composite indicate the effective corrosion protection of the polypyrrole/$SiO2$ composite when added as additive in the epoxy resin. Further, the high values of anodic and cathodic Tafel constants of specimens PS1 and PS2 implies the effective role of polymer composite in controlling anodic and cathodic corrosion reactions. Interestingly, the icon for epoxy coatings with 1.0 and 2.0 wt % loading of chitosan-polypyrrole-$SiO2$ composites CsPC1 and CsPC2, respectively was observed to be significantly low as compared to epoxy coating (EC) (Table 1). The icon of CsPC1 and CsPC2 occur almost three orders of magnitude and more than three orders of magnitude less, respectively as compared to specimen EC. The corrosion protection efficiency (% P.E.) calculated as per equation 1 are also shown in Table 1. The highest % P.E. (99.99) is measured for specimen CsPC2 exhibiting its superior corrosion resistance property. Good corrosion protection is often shown by coatings that are able to isolate metals from the corrosive ions. These coatings have superior barrier properties and are well adherent to metal surface in the presence of corrosive ions. However, a sudden increase in ings. In addition to this, $SiO2$ particles present in the composite act as a reinforcing material in the coating. It is presumed that the presence of $SiO2$ particles in coating matrix inhibit the penetration of electrolyte into the interface and enhance the corrosion protection efficiency as well as adhesion of the coating. These are reasons that chitosan-polpyrrole-$SiO2$ composite is able to delay the onset of the corrosion of metal in a greater time than the epoxy coating, reinforcing its corrosion protection efficiency.

Weight Loss Method

The electrochemical measurements clearly show that the presence of chitosan in the composite improves the corrosion resistance properties of the epoxy coatings. However, it is equally important to evaluate the long term corrosion protection offered by the coatings. Table 2 shows the weight loss parameters of epoxy coated and epoxy with polymer composite coated steel specimens immersed in 3.5% NaCl solution for 60 days.

TABLE 2

Weight loss parameters of coated mild steel specimens after immersion test in 3.5% NaCl for 60 days.

| Sample Name | Initial Weight (mg) | Final Weight (mg) | Weight Loss (mg) | Corrosion Rate (mm/year) |
|---|---|---|---|---|
| EC | 29194.3 | 21486.4 | 7707.9 | 1.066 |
| PS2 | 28851.2 | 23016.4 | 5834.8 | 0.805 |

TABLE 2-continued

Weight loss parameters of coated mild steel specimens after immersion test in 3.5% NaCl for 60 days.

| Sample Name | Initial Weight (mg) | Final Weight (mg) | Weight Loss (mg) | Corrosion Rate (mm/year) |
|---|---|---|---|---|
| CP | 28932.6 | 28175.9 | 756.7 | 0.104 |
| CsPC2 | 29479.4 | 29022.7 | 456.7 | 0.063 |

The epoxy coated steel specimen evidenced highest corrosion rate (1.06 mm/y) (Table 2). This is due to the easy diffusion of chloride ions through the pores of the coating that ultimately causes metal dissolution at the coating/metal interface. However, the corrosion rate was found to be significantly less for epoxy with 2.0 wt % loading of chitosan-polypyrrole-SiO2 composite (0.063 mm/y). The good barrier property of chitosan present in the composite is the reason for low electrolyte diffusion through the coating and subsequently less rate of corrosion. In addition to this, the SiO2 particles present as a reinforcing material in the composite, support the integrity of the coating during prolong exposure to corrosive electrolyte like 3.5% NaCl solution, which delays the breaking of the chemical bond between the coating and the metal surface by inhibiting the diffusion of the chloride ions.

Example 10

Salt Spray Test

FIG. 5 shows the photographs of epoxy coated (EC), epoxy with different wt % loading of chitosan-polypyrrole-SiO2 composites (CsPC1, CsPC2 and CsPC3) coated steel panels. For comparative studies, epoxy with polypyrrole-SiO2 (PS) and chitosan-polypyrrole (CP) composite coated steel panels were also exposed to salt spray fog for 65 days. Severe rusting throughout the scribe mark occurred for epoxy coated steel panel (FIG. 5a). The photographs of the epoxy with chitosan-polypyrrole-SiO2 composite coated steel panels CsPC1, CsPC2 and CsPC3 are shown in FIGS. 5b, c and d respectively. The specimens CsPC1 and CsPC2 exhibited almost no extended corroded area along the scribe mark (FIGS. 5b and c). However, the coating degraded with further increase of percentage loading of chitosan-polypyrrole-SiO2 composite, as start of corrosion is noticed from the epoxy coating with 3.0 wt % loading of chitosan-polypyrrole-SiO2 composite (FIG. 5d). The results clearly show that the chitosan-polypyrrole-SiO2 composites are very effective in preventing corrosion and delayed the degradation of coatings exposed to environmental conditions such as high humidity and high salt content.

Example 11

Adhesion Tests of the Coatings

The adhesion of the coatings was tested as per IS 101 Part V Sec (2), using cross cut adhesion test and bend test. The steel specimens coated with epoxy and epoxy with polymer composites were found to pass the cross cut adhesion test as no detachment of the coating was observed during the test. FIG. 6a-d illustrate the photographs of the coatings subjected to deformation by bending to 175°. The surface of the epoxy coating exhibited severe cracking that propagate from the edges to the centre of the coating (FIG. 6a). However, a qualitative good adhesion was observed for epoxy coatings with 1.0 wt % (CsPC1) and 2.0 wt % (CsPC2) loading of chitosan-polypyrrole-SiO2 composite (FIGS. 6b and c, respectively). Further, the coating produced with 3.0 wt % loading of chitosan-polypyrrole-SiO2 composite showed appearance of few cracks at the edges of the coating (FIG. 6d). This could be due to the higher loading of composite; that had detrimental effect on the adhesion of the coating to its substrate. The bend test results for specimen CsPC3 were in accordance with the Tafel polarization and EIS studies where a high corrosion current density (icorr) and low pore resistance (Rpore) was measured exhibiting its comparatively less corrosion protection efficiency as compared to the specimens CsPC1 and CsPC2.

Comparative Example 12

Preparation of Conducting Polymer Polypyrrole Embedded on Silica Particles in the Presence of Sodium Lauryal Sulphate 1 wt % of pyrrole was mixed with 1% of silica particles and mixture was mixed thoroughly so that pyrrole is adsorbed on silica particles. To this mixture, 2% of sodium lauryl sulphate dissolved in 1.0 lt of water is added which acts as a doping medium and the mixture was homogenized for 2 hours. The reaction vessel was cooled to 0° C.±1° C. and to this solution, 2% of oxidant, ferric chloride dissolved in 0.1 lt of distilled water, was added drop by drop. The stirring was continued for 4-6 hours. After polymerization was complete, the precipitate was filtered and washed thoroughly with distilled water and dried at 50-60° C. in an oven. Schematic of the synthesis of polypyrrole encapsulated with SiO2 particles is shown as:

The polymer so obtained was mixed with snow white glossy epoxy powder No. HGC 1327 (bisphenol A+polyester) in the weight ratio ranging from 1-6%. A homogeneous mixture of well dispersed polymer in epoxy was obtained after ball milling. The epoxy mixed with polymer was then powder coated on steel substrates by powder coating technique. After coating, the samples were kept in an oven at 140-160° C. for 2-3 hours. The mild steel powder coated samples were then tested for their corrosion performance by electrochemical technique by obtaining Tafel Plot and were tested for their critical performance by salt spray test in 3.5% NaCl.

Example 13

Comparative Example

Conducting Polymer Polyaniline Synthesized in Perfluoro Octaonic Acid

1% of aniline was taken in reaction vessel to which 2% of perfluorooctaonic acid (PFOA) in 1.0 lt of distilled water was added and the mixture was homogenized for 2 hours. The reaction vessel was cooled to 0° C.±1° C. and to this solution, 1% of oxidant, ammonium persulphate dissolved in 0.1 lt of distilled water, was added drop by drop. The stirring was continued for 4-6 hours. After polymerization was complete, the precipitate was filtered and washed thoroughly with distilled water and dried at 50-60° C. in an oven.

The polymer so obtained was mixed with snow white glossy epoxy powder in the weight ratio ranging from 1-6%. The epoxy mixed with polymer was then powder coated on steel substrates by powder coating technique. After coating, the samples were kept in an oven at 140-160° C. for 2-3 hours. The mild steel powder coated samples were then tested for their corrosion performance by electrochemical technique by obtaining Tafel Plot and were tested for their critical performance by salt spray test in 3.5% NaCl. This was the comparative polymer mixed with epoxy for corrosion studies. The loading values of polymer in epoxy with protection efficiency evaluation is given in Table 5.

Example 14

Preparation of Conducting Polymer Polyaniline Embedded on Silica Particle in the Presence of Perfluoro Octaonic Acid 0.1 M of aniline was mixed with 9.3 gms of silica particles and mixture was mixed thoroughly so that aniline is adsorbed on silica particles. To this mixture, 0.2 M of perfluorooctaonic acid (PFOA) dissolved in 1.0 lt of water is added which acts as a doping medium and the mixture was homogenized for 2 hours. The reaction vessel was cooled to 0° C.±1° C. and to this solution, 0.1 M of oxidant, ammonium persulphate dissolved in 0.1 lt of distilled water, was added drop by drop. The stirring was continued for 4-6 hours. After polymerization was complete, the precipitate was filtered and washed thoroughly with distilled water and dried at 50-60° C. in an oven.

The polymer so obtained was mixed with snow white glossy epoxy powder No. HGC 1327 (bisphenol A+polyester) in the weight ratio ranging from 1-6%. A homogeneous mixture of well dispersed polymer in epoxy was obtained after ball milling. The epoxy mixed with polymer was then powder coated on steel substrates by powder coating technique. After coating, the samples were kept in an oven at 140-160° C. for 2-3 hours. The mild steel powder coated samples were then tested for their corrosion performance by electrochemical technique by obtaining Tafel Plot and were tested for their critical performance by salt spray test in 3.5% NaCl.

Example 15

Preparation of Conducting Polymer Polyaniline Embedded on Flyash Particles in the Presence of Perfluoro Octaonic Acid 0.1 M of aniline was mixed with 9.3 gms of flyash particles and mixture was mixed thoroughly sothat aniline is adsorbed on flyash particles. To this mixture, 0.2 M of perfluorooctaonic acid (PFOA) dissolved in 1.0 lt of water is added which acts as a doping medium and the mixture was homogenized for 2 hours. The reaction vessel was cooled to 0° C.±1° C. and to this solution, 0.1 M of oxidant, ammonium persulphate dissolved in 0.1 lt of distilled water, was added drop by drop. The stirring was continued for 4-6 hours. After polymerization was complete, the precipitate was filtered and washed thoroughly with distilled water and dried at 50-60° C. in an oven.

The polymer so obtained was mixed with snow white glossy epoxy powder No. HGC 1327 (bisphenol A+polyester) in the weight ratio ranging from 1-6%. A homogeneous mixture of well dispersed polymer in epoxy was obtained after ball milling. The epoxy mixed with polymer was then powder coated on steel substrates by powder coating technique. After coating, the samples were kept in an oven at 140-160° C. for 2-3 hours. The mild steel powder coated samples were then tested for their corrosion performance by electrochemical technique by obtaining Tafel Plot and were tested for their critical performance by salt spray test in 3.5% NaCl.

Example 16

Preparation of Copolymer of Aniline and o-anisidine Embedded on Silica Particle in the Presence of Perfluoro Octaonic Acid 0.05 M of aniline and 0.05 M of o-anisidine were mixed with 9.3 gms of silica particles and mixture was mixed thoroughly so that both monomers are adsorbed on silica particles. To this mixture, 0.2 M of perfluorooctaonic acid (PFOA) dissolved in 1.0 lt of water is added which acts as a doping medium and the mixture was homogenized for 2 hours. The reaction vessel was cooled to 0° C.±1° C. and to this solution, 0.1 M of oxidant, ammonium persulphate dissolved in 0.1 lt of distilled water, was added drop by drop. The stirring was continued for 4-6 hours. After polymerization was complete, the precipitate was filtered and washed thoroughly with distilled water and dried at 50-60° C. in an oven.

The co-polymer so obtained was mixed with snow white glossy epoxy powder No. HGC 1327 (bisphenol A+polyester) in the weight ratio ranging from 1-6%. A homogeneous mixture of well dispersed polymer in epoxy was obtained after ball milling. The epoxy mixed with polymer was then powder coated on steel substrates by powder coating technique. After coating, the samples were kept in an oven at 140-160° C. for 2-3 hours. The mild steel powder coated samples were then tested for their corrosion performance by electrochemical technique by obtaining Tafel Plot and were tested for their critical performance by salt spray test in 3.5% NaCl. FIG. 7 shows the Tafel plots of (a) epoxy coated and epoxy with (b) 1 wt %, (c) 2 wt %, (c) 3 wt % and 4 wt % loading of copolymer of (aniline+anisidine)/SiO2 composite coated mild steel specimens in 3.5% NaCl solution at room temperature (25+3° C.). Table 3 shows corrosion inhibition efficiency of different loadings of copolymers in the epoxy.

TABLE 3

Different electrochemical parameters obtained for copolymer of (aniline + anisidine)/SiO2 composite coated steel specimens by Tafel extrapolation in 3.5% NaCl solution.

| Sample Name | Loading level of composite | Ecorr (mV) | icorr (A/cm2) | Rp (KΩ) | Protection Efficiency (% P.E) |
|---|---|---|---|---|---|
| EC    | —       | −582.4 | $8.4 \times 10^{-7}$  | 31.8   | —     |
| PANI1 | 1.0 wt % | −15.86 | $1.2 \times 10^{-9}$  | 47150  | 99.93 |
| PANI2 | 2.0 wt % | −92.87 | $0.29 \times 10^{-9}$ | 247590 | 99.98 |
| PANI3 | 3.0 wt % | −28.76 | $0.38 \times 10^{-9}$ | 130760 | 99.97 |
| PANI4 | 4.0 wt % | −68.90 | $0.24 \times 10^{-9}$ | 145920 | 99.97 |

Example 17

Preparation of Copolymer of Aniline and o-phenetidine Embedded on Silica Particle in the Presence of Perfluoro Octaonic Acid 0.05 M of aniline and 0.05 M of o-phenetidine were mixed with 9.3 gms of silica particles and mixture was mixed thoroughly so that both monomers are adsorbed on silica particles. To this mixture, 0.2 M of perfluorooctaonic acid (PFOA) dissolved in 1.0 lt of water is added which acts as a doping medium and the mixture was homogenized for 2 hours. The reaction vessel was cooled to 0° C.±1° C. and to this solution, 0.1 M of oxidant, ammonium persulphate dissolved in 0.1 lt of distilled water, was added drop by drop. The stirring was continued for 4-6 hours. After polymerization was complete, the precipitate was filtered and washed thoroughly with distilled water and dried at 50-60° C. in an oven.

The co-polymer so obtained was mixed with snow white glossy epoxy powder No. HGC 1327 (bisphenol A+polyester) in the weight ratio ranging from 1-6%. A homogeneous mixture of well dispersed polymer in epoxy was obtained after ball milling. The epoxy mixed with polymer was then powder coated on steel substrates by powder coating technique. After coating, the samples were kept in an oven at 140-160° C. for 2-3 hours. The mild steel powder coated samples were then tested for their corrosion performance by electrochemical technique by obtaining Tafel Plot and were tested for their critical performance by salt spray test in 3.5% NaCl. FIG. 8 shows the Tafel plots of (a) epoxy coated and epoxy with (b) 1 wt %, (c) 2 wt %, (c) 3 wt % and 4 wt % loading of copolymer of (aniline+anisidine)/SiO2 composite coated mild steel specimens in 3.5% NaCl solution at room temperature (25+3° C.). Table 4 gives protection efficiency of different loading of copolymers of aniline and phenetidine in epoxy coated on mild steel panels.

TABLE 4

Different electrochemical parameters obtained for copolymer of (aniline + phenetidine) composite coated steel specimens by Tafel extrapolation in 3.5% NaCl solution.

| Sample Name | Loading level of composite | Ecorr (mV) | icorr (A/cm2) | Rp (KΩ) | Protection Efficiency (% P.E) |
|---|---|---|---|---|---|
| EC | — | −582.4 | 8.4 × 10−7 | 31.8 | — |
| PCs1 | 1.0 wt % | −566 | 1.7 × 10−8 | 386 | 91.7 |
| PCs2 | 2.0 wt % | 65.2 | 1.05 × 10−9 | 58730 | 99.9 |
| PCs3 | 3.0 wt % | −468 | 8.48 × 10−9 | 3720 | 99.1 |
| PCs4 | 4.0 wt % | −547 | 6.3 × 10−8 | 274 | 88.3 |

A comparison of all the conducting polymer loadings in poxy in the presence of SiO2 particles is shown in Table 5. Which shows comparison of different loadings of the polymer, polyaniline, polypyrrole, copolymer of aniline and ansidine and copolymer of aniline and phenetidine in the epoxy matrix and the corresponding corrosion inhibition efficiency.

TABLE 5

Comparison of Corrosion inhibition efficiency for corrosion of mild steel in 3.5% NaCl with different loading levels of PANI and PANI-SiO2 Composite and polypyrrole and Polypyrrole-SiO2 composite and copolymers of aniline and anisidine

| Sample Name | Loading Level of polymer (%) | Protection Efficiency (%) |
|---|---|---|
| PANI | 1.5 | 39.43 |
|  | 3.0 | 42.16 |
|  | 4.5 | 71.6 |
|  | 6.0 | 80.84 |
| PANI-SiO2 Composite | 1.5 | 69.39 |
|  | 3.0 | 87.98 |
|  | 4.5 | 94.21 |
|  | 6.0 | 96.0 |
| Copolymer (An + Ans) | 1.0 | 99.93 |
|  | 2.0 | 99.98 |
|  | 3.0 | 99.97 |
|  | 4.0 | 99.97 |

TABLE 5-continued

Comparison of Corrosion inhibition efficiency for corrosion of mild steel in 3.5% NaCl with different loading levels of PANI and PANI-SiO2 Composite and polypyrrole and Polypyrrole-SiO2 composite and copolymers of aniline and anisidine

| Sample Name | Loading Level of polymer (%) | Protection Efficiency (%) |
|---|---|---|
| Copolymer (An + Phen) | 1.0 | 91.7 |
|  | 2.0 | 99.9 |
|  | 3.0 | 99.1 |
|  | 4.0 | 88.3 |
| PPy-SiO2 Composite | 1.0 | 81.5 |
|  | 2.0 | 98.7 |
|  | 3.0 | 99.9 |
|  | 4.0 | 99.8 |
| PPy-Chitosan-SiO2 Composite | 1.0 | 99.96 |
|  | 2.0 | 99.97 |
|  | 3.0 | 99.85 |
|  | 4.0 | 99.92 |

Advantages of the Invention

The self-healing anti-corrosive coatings of the present invention exhibit anti corrosive effect in marine conditions.

The prepared coatings when powder coated on mild steel surfaces act as barrier for corrosion and exhibit corrosion inhibition efficiency of the order of >99% when exposed to highly saline conditions upto 5.0% NaCl.

The developed composites cause significant improvement in the corrosion resistance of coatings.

The synergy of chitosan-polypyrrole inhibits the diffusion of chloride ions and SiO2 particles as filler reinforce the corrosion resistance of the coating.

What is claimed is:

1. A self-healing anti corrosive coating composition, wherein the said composition comprises a mixture of:
   1 to 5 wt % silica
   1 to 5 wt % chitosan; and
   4 to 20 wt % of a conducting polymer;
   wherein 1 to 6 wt % of the mixture is combined with 99.0 to 94.0 wt % of an epoxy to obtain the self-healing anti corrosive coating composition; and the chitosan and the conducting polymer are present as a matrix of clustered spherical nanoparticles, each of the spherical nanoparticles having a diameter of 40-60 nm.

2. The composition of claim 1, wherein the conducting polymer is selected from the group consisting of polypyrrole, polyaniline and a copolymer of aniline and anisidine.

3. The composition of claim 1 comprising a ratio of silica:chitosan:conducting polymer:epoxy of 1:1:4:96.

4. The composition of claim 1, wherein the epoxy comprises: 70 wt % resin 2.3 wt % Flow agent, 0.7 wt % degassing agent, and 27 wt % fillers.

5. A method of coating a mild steel substrate comprising powder coating the composition of claim 1 onto the substrate.

6. A coated substrate comprising a cured coating comprising the composition of claim 1, wherein the cured coating exhibits anti-corrosive activity in saline water comprising 3.5 to 5.0% NaCl under accelerated conditions according to ASTM standard B117D.

7. A process for preparing the self-healing anti-corrosive coating composition of claim 1, the process comprising:
   mixing chitosan-polypyrrole-SiO$_2$ composite particles with an epoxy resin in a ratio of particles:resin of 1-6 wt %: 99-94 wt %.

8. The process of claim 7, wherein the chitosan-polypyrrole-$SiO_2$ composite particles are prepared by:
- dispersing monodispersed $SiO_2$ particles in a solution comprising chitosan to form a first mixture;
- adding a polymerization medium to the first mixture to form a second mixture;
- sequentially adding a monomer configured to form a conducting polymer and an oxidant to the second mixture to form a third mixture comprising chitosan-polypyrrole-$SiO_2$ particles;
- collecting the chitosan-polypyrrole-$SiO_2$ particles.

9. The process of claim 8, wherein the monodispersed $SiO_2$ particles are prepared by hydrolyzing an ethanolic solution of tetra-ethyl orthosilicate with an ammonia catalyst.

10. The process of claim 8, wherein the polymerization medium is selected from the group consisting of sodium lauryl sulphate, sodium p-toluenesulphonate, o-phosphoric acid, and perfluorooctanoic acid.

11. The process of claim 8, wherein the polymerization medium comprises sodium p-toluenesulphonate.

12. The process of claim 8, wherein the oxidant for polymerization is selected from the group consisting of ferric chloride, ferric phosphate, and ammonium persulphate.

13. The process of claim 8, wherein the oxidant comprises ferric chloride.

14. The process of claim 8, wherein the monomer comprises pyrrole, aniline, anisidine, or a mixture of any two or more thereof.

* * * * *